G. H. Henkel. Extension Table.
No. 122,946. Patented Jan. 23, 1872.

Witnesses:
E. Wolff
Gustave Dietrich

Inventor:
G. H. Henkel
per
Attorneys.

UNITED STATES PATENT OFFICE.

GEORGE H. HENKEL, OF GERMANTOWN, OHIO.

IMPROVEMENT IN EXTENSION TABLES.

Specification forming part of Letters Patent No. 122,946, dated January 23, 1872.

*To all whom it may concern:*

Be it known that I, GEORGE H. HENKEL, of Germantown, in the county of Montgomery and State of Ohio, have invented a new and Improved Extension Table; and I do hereby declare that the following is a full, clear, and exact description thereof, which will enable others skilled in the art to make and use the same, reference being had to the accompanying drawing forming part of this specification, in which—

Figure 1:
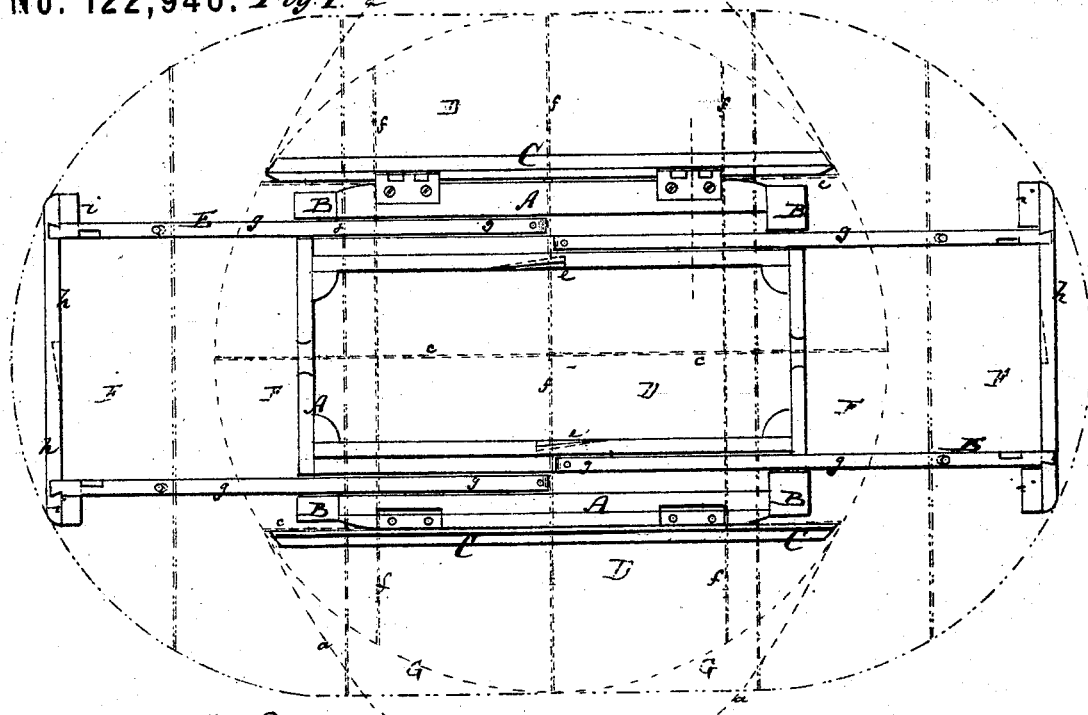
Figure 2:
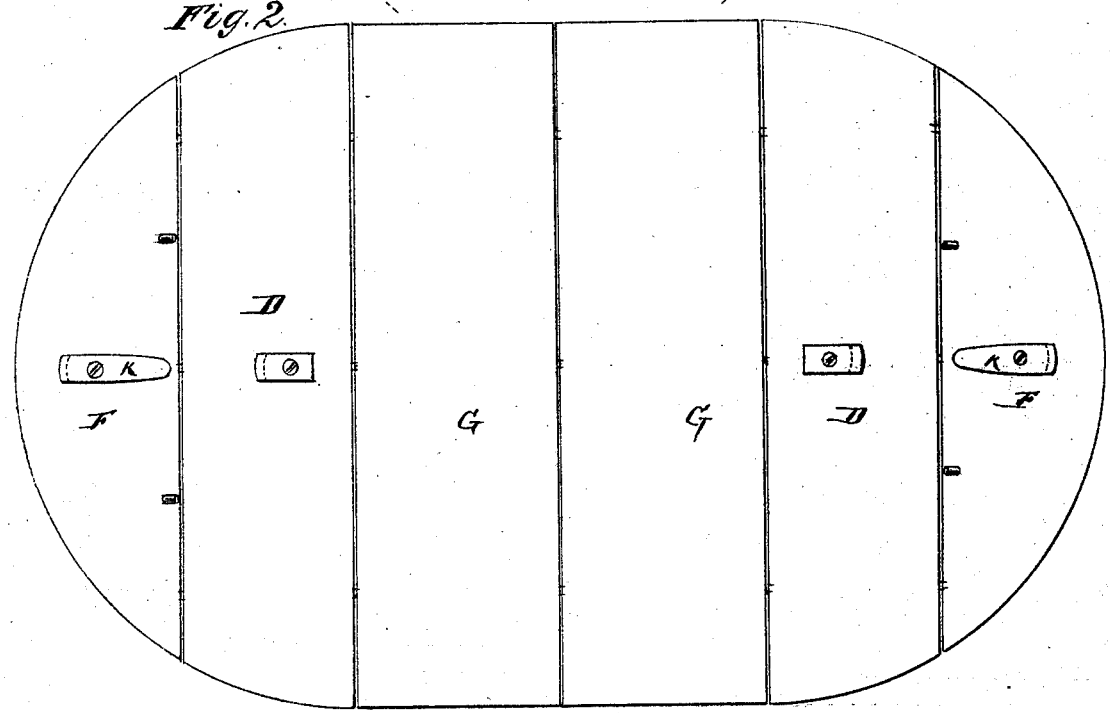
Figure 3:
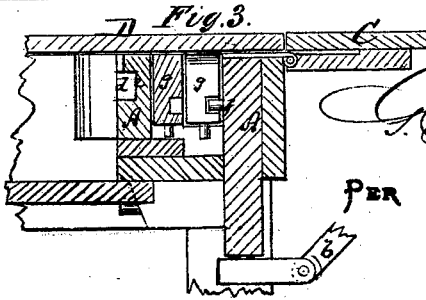

Fig. 1 represents a plan or top view of my improved extension table, showing the leaves in dotted lines. Fig. 2 is a bottom view of the leaves. Fig. 3 is a detail vertical transverse section of the table.

Similar letters of reference indicate corresponding parts.

This invention relates to a new extension drop-leaf table, which can be used either with a circular, oval, or extended top, as may be desired. The invention consists in a new manner of fastening the leaves and in a novel method of adjusting and utilizing the several parts, as hereinafter more fully described.

A in the drawing represents the main frame of the table, supported on the four legs B B, and made of substantial construction. To the sides of the frame A are hinged leaves C C, shown in Fig. 3, and by the dotted line $a$ in Fig. 1. These leaves can be let down or held up horizontally by suitable braces $b$, and serve, together with the central leaves D D, to constitute an oval table, provided the said leaves D are placed with their edges parallel to the sides of the table, as shown by the dotted lines $c\ c$ in Fig. 1. The leaves D are in this position locked to the frame A by means of hooks $d$ projecting from the bottoms of the leaves into slanting recesses $e$ at the sides of the frame A. In place of the folding leaves C the frame may be finished at the sides like a card-table. When the leaves D are turned at right angles to their stated first position, as in Fig. 2, and by lines $f$ in Fig. 1, they can be used as part of a circular or extension table. E E are the extension frames. Each of them consists of two horizontal bars, $g\ g$, one end cross-piece, $h$, and two legs, $i\ i$. The bars $g$ slide in the frame A close to the side pieces of the same, and are grooved to receive a guide and stop-pin, $j$, as in Fig. 3.

When a circular table is to be produced the segmental leaves F are placed upon the ends of the frames E, fitted thereto by upright or inclined dowels, and locked to notches in the end pieces $h$ by pivoted buttons K. The inner leaves D are turned at right angles and the frames E drawn in until the leaves D and F are in proper contact. The circular table shown in Fig. 1 is thus obtained.

For an extension table the same leaves D and F are used, together with a suitable number of extension leaves G interposed between them.

The box of the table-body can be used as a receptacle for napkins, table-cloths, and other articles.

Having thus described my invention, I claim as new, and desire to secure by Letters Patent—

The leaves D, so constructed that when arranged at right angles with their position in an extension table they combine with the leaves C to form an oval table, substantially as described.

GEO. H. HENKEL.

Witnesses:
  FRANK CUNNINGHAM,
  J. W. SHORTS.